(12) United States Patent
Khan et al.

(10) Patent No.: US 9,977,904 B2
(45) Date of Patent: May 22, 2018

(54) SYSTEMS AND METHODS FOR AUTOMATED DETECTION OF APPLICATION VULNERABILITIES

(71) Applicant: The Board of Regents, The University of Texas System, Austin, TX (US)

(72) Inventors: Latifur Khan, Plano, TX (US); Zhiqiang Lin, Dallas, TX (US); Bhavani Thuraisingham, Dallas, TX (US); Justin Sahs, Richardson, TX (US); David Sounthiraraj, Richardson, TX (US); Garrett Greenwood, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 70 days.

(21) Appl. No.: 14/629,876

(22) Filed: Feb. 24, 2015

(65) Prior Publication Data

US 2015/0242636 A1 Aug. 27, 2015

Related U.S. Application Data

(60) Provisional application No. 61/944,304, filed on Feb. 25, 2014.

(51) Int. Cl.
*H04L 29/06* (2006.01)
*G06F 21/57* (2013.01)
*H04W 88/02* (2009.01)

(52) U.S. Cl.
CPC ........ *G06F 21/577* (2013.01); *H04L 63/1433* (2013.01); *G06F 2221/033* (2013.01); *H04W 88/02* (2013.01)

(58) Field of Classification Search
CPC ... H04L 9/3242; H04L 63/126; H04L 9/3247; G06F 2221/2129; G06F 21/44
See application file for complete search history.

(56) References Cited

U.S. PATENT DOCUMENTS

| 7,657,937 | B1 * | 2/2010 | Kumar | ............... H04L 63/1416 726/23 |
| 2005/0273854 | A1 * | 12/2005 | Chess | ................. G06F 11/3612 726/22 |
| 2011/0225655 | A1 * | 9/2011 | Niemela | ............... G06F 21/566 726/24 |
| 2011/0321139 | A1 * | 12/2011 | Jayaraman | .............. G06F 21/51 726/4 |

OTHER PUBLICATIONS

NPL—May 2011—Hu et al. Automating GUI Testing for Android Applications.*

(Continued)

*Primary Examiner* — Tri Tran
(74) *Attorney, Agent, or Firm* — Thomas|Horstemeyer, LLP

(57) ABSTRACT

Disclosed are systems and methods for performing automatic, large-scale analysis mobile applications to determine and analyze application vulnerability. The disclosed systems and methods include identifying potentially vulnerable applications, identifying the application entry points that lead to vulnerable behavior, and generating smart input for text fields. Thus, a fully automated framework is implemented to run in parallel on multiple emulators, while collecting vital information.

20 Claims, 10 Drawing Sheets

(56) References Cited

OTHER PUBLICATIONS

Artzi, Shay, et al. "A framework for automated testing of javascript web applications." Software Engineering (ICSE), 2011 33rd International Conference on. IEEE, 2011.

Christodorescu, Mihai, and Somesh Jha. Static analysis of executables to detect malicious patterns. Wisconsin Univ-Madison Dept of Computer Sciences, 2006.

Clark, Jeremy, and Paul C. van Oorschot. "SoK: SSL and HTTPS: Revisiting past challenges and evaluating certificate trust model enhancements." Security and Privacy (SP), 2013 IEEE Symposium on. IEEE, 2013: 511-525.

Enck, William, et al. "TaintDroid: An Information-Flow Tracking System for Realtime Privacy Monitoring on Smartphones." In Proceedings of the 9th USENIX conference on Operating systems design and implementation (2010).

Fahl, Sascha, et al. "Why Eve and Mallory love Android: An analysis of Android SSL (in) security." Proceedings of the 2012 ACM conference on Computer and communications security. ACM, 2012.

Felt, Adrienne Porter, et al. "A survey of mobile malware in the wild." Proceedings of the 1st ACM workshop on Security and privacy in smartphones and mobile devices. ACM, 2011.

Georgiev, Martin, et al. "The most dangerous code in the world: validating SSL certificates in non-browser software." Proceedings of the 2012 ACM conference on Computer and communications security. ACM, 2012.

Hu, Cuixiong, and Iulian Neamtiu. "Automating GUI testing for Android applications." Proceedings of the 6th International Workshop on Automation of Software Test. ACM, 2011.

Kolter, J. Zico, and Marcus A. Maloof. "Learning to detect and classify malicious executables in the wild." The Journal of Machine Learning Research 7 (2006): 2721-2744.

Portokalidis, Georgios, et al. "Paranoid Android: versatile protection for smartphones." Proceedings of the 26th Annual Computer Security Applications Conference. ACM, 2010.

Rastogi, Vaibhav, Yan Chen, and William Enck. "AppsPlayground: automatic security analysis of smartphone applications." Proceedings of the third ACM conference on Data and application security and privacy. ACM, 2013.

Yan, Lok-Kwong, and Heng Yin. "DroidScope: Seamlessly Reconstructing the OS and Dalvik Semantic Views for Dynamic Android Malware Analysis." USENIX security symposium. 2012.

Zheng, Cong, et al. "Smartdroid: an automatic system for revealing ui-based trigger conditions in android applications." Proceedings of the second ACM workshop on Security and privacy in smartphones and mobile devices. ACM, 2012.

Zhou, Wu, et al. "Detecting repackaged smartphone applications in third-party android marketplaces." Proceedings of the second ACM conference on Data and Application Security and Privacy. ACM, 2012.

Zhou, Yajin, et al. "Hey, You, Get Off of My Market: Detecting Malicious Apps in Official and Alternative Android Markets." NDSS. 2012.

\* cited by examiner

Algorithm 1: traverse: Vulnerable Entry Point Identification input  : seed, the constructor of a vulnerable class
             node, the current node in the MCG
             constructors, the set of traversed constructors
  output: the set of vulnerable entry point methods 1 begin
2    if parents(node) ≠ ∅ then
3       for *parent* ∈ parents(node) do
4          traverse (seed,*parent*,constructors)
5    else
6       for *method* ∈ methods(class(node)) do
         /* *method* is never called.
           Continue traversing from its
           class' constructor.        */
7          if *method* is the class' constructor
         ∧ *method* ∉ constructors then
8            constructors ← constructors ∪ *method*
9            traverse(seed,*method*,constructors)
         /* *method* is a constructor that
           is never called; report it
           as an entry point.         */
10         else if *method* ∈ constructors then
11            output(*method*,seed)

FIG. 4

```
Algorithm 2: Smart Input Generation
  input  : app, the app to be analyzed
  output : input text for text boxes
1 begin
2     map ← ∅
3     for act ∈ getActivities(app) do
4         layout ← getLayoutForActivity(act)
          // loop over EditText elements in the layout
5         for elem ∈ getUIElemsByType(layout, "EditText") do
6             elem_id ← getUIElemID(elem.name) // translate the element's name to an id
7             input_type ← getUIElemInputType(elem_id) // get the input type if there is one
8             if input_type found then
9                 map ← map ∪ {elem_id ↦ input_type}
10                continue to the next element
              // if there is no type annotation,
              // trace the access of the element through the activity's code
11            instance_var ← getInstanceVariableForID(act, elem_id)
12            reads ← getAccessLocations(instance_var)
13            for {read ∈ reads | "getText" ∈ read} do // when the getText function is called
                  // search for and record type casts
14                text_var ← variable containing the result of the getText call
15                type_cast ← getTypeCastOperation(text_var)
16                if type_cast found then
17                    map ← map ∪ {elem_id ↦ type_cast}
18                    continue to the next element
19                else
20                    continue to the next read
21    return translateTypeToInput(map)
```

```
Algorithm 3: schedule: Application Scheduling
  input: apps, a list of apps to be tested
1 begin
2     for app ∈ apps do
          /* get an emulator from the
             management thread; this is a
             blocking call                      */
3         emulator ← getEmulator()
4         install(emulator, app)
          /* for each vulnerable entry point
             from static analysis               */
5         for activity ∈ getEntryPoints(app) do
6             startActivity(emulator, activity)
7             automateUI(emulator, activity)
8         uninstall(emulator, app)
9         releaseEmulator(emulator)
```

FIG. 8

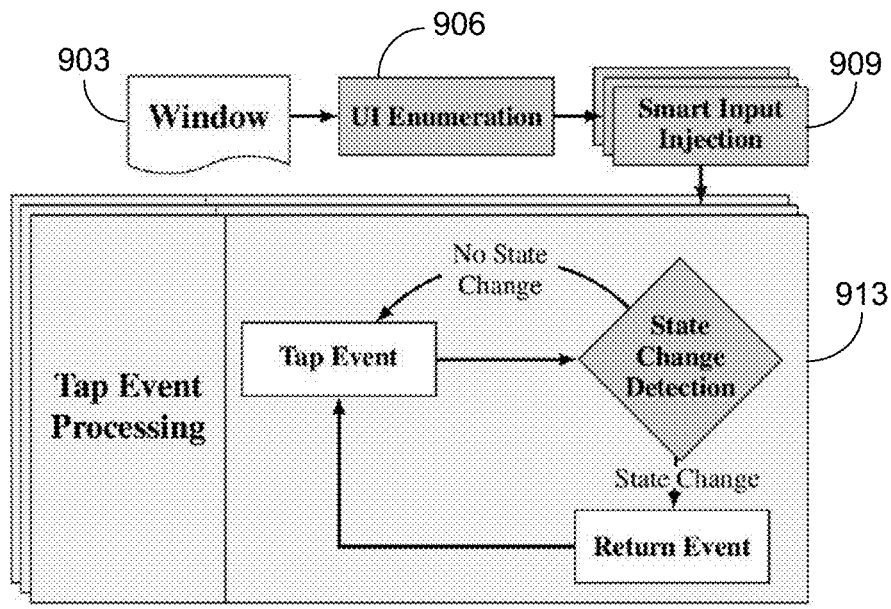

FIG. 9

SYSTEMS AND METHODS FOR AUTOMATED DETECTION OF APPLICATION VULNERABILITIES

CROSS-REFERENCE TO RELATED APPLICATIONS

This application claims priority to, and the benefit of, provisional application entitled "SYSTEM AND METHOD FOR AUTOMATED DETECTION OF SSL/TLS MAN-IN-THE-MIDDLE VULUNERABILITIES," filed on Feb. 25, 2014, and assigned application No. 61/944,304, which is incorporated herein by reference in its entirety.

STATEMENT OF GOVERNMENT INTEREST

This invention was made with support by Air Force Office of Scientific Research grant FA-9550-12-1-0077. The U.S. government has rights in the invention.

BACKGROUND

Many applications use secure sockets layer (SSL) or transport layer security (TLS) protocols to transmit sensitive information securely. However, developers often provide their own implementation of the standard SSL/TLS certificate validation process. Many of these custom implementations suffer from defects leaving the applications vulnerable to SSL/TLS man-in-the-middle attacks. In this way, attackers can gain access to highly confidential information provided by a user through these vulnerable applications.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 4 and 5 are example algorithms of functionality implemented as portions of the application vulnerability service executed in the networked environment of FIG. 1.

FIG. 6 is sample code of one embodiment of functionality implemented as portions of an application vulnerability service executed in the networked environment of FIG. 1.

FIG. 8 is an example algorithm of functionality implemented as portions of an application vulnerability service executed in the networked environment of FIG. 1.

FIG. 9 is a block diagram illustrating examples of functionality implemented by the networked environment of FIG. 1.

DETAILED DESCRIPTION

The present disclosure relates to systems and methods for automatically detecting and identifying vulnerabilities in applications. A number of applications offered by an application marketplace use modified security protocols that can compromise highly sensitive information. Given a large set of mobile applications, a static and dynamic analysis can be performed on each application to determine which ones are vulnerable. In particular, applications can be analyzed to determine which applications include modified security protocols. If an application includes a modified security protocol, then the application can be deemed to be potentially vulnerable. Further analysis can be performed on each application to trace the invocation of vulnerable code associated with the modified security protocol back to an entry point user interface window of the application. Smart input can be generated for the user input elements on the entry point window of the application.

The system can then begin dynamically testing each of the applications to see if the modified security protocol actually comprises secure data. To begin, each of the potentially vulnerable applications can be installed and executed on emulated mobile computing devices. User input automation can be performed on each of the applications. Specifically, the generated smart input can be provided to the user input elements on the entry point window. Execution of each of the applications can trigger HTTPS traffic from the application. This traffic can pass through a proxy configured to attempt a secure sockets layer (SSL) man-in-the-middle (MITM) attack, for example. Data regarding successful and failed attempts by the proxy to intercept the traffic from the applications can be recorded. The data can be analyzed to determine which applications are actually vulnerable.

Figure 1:
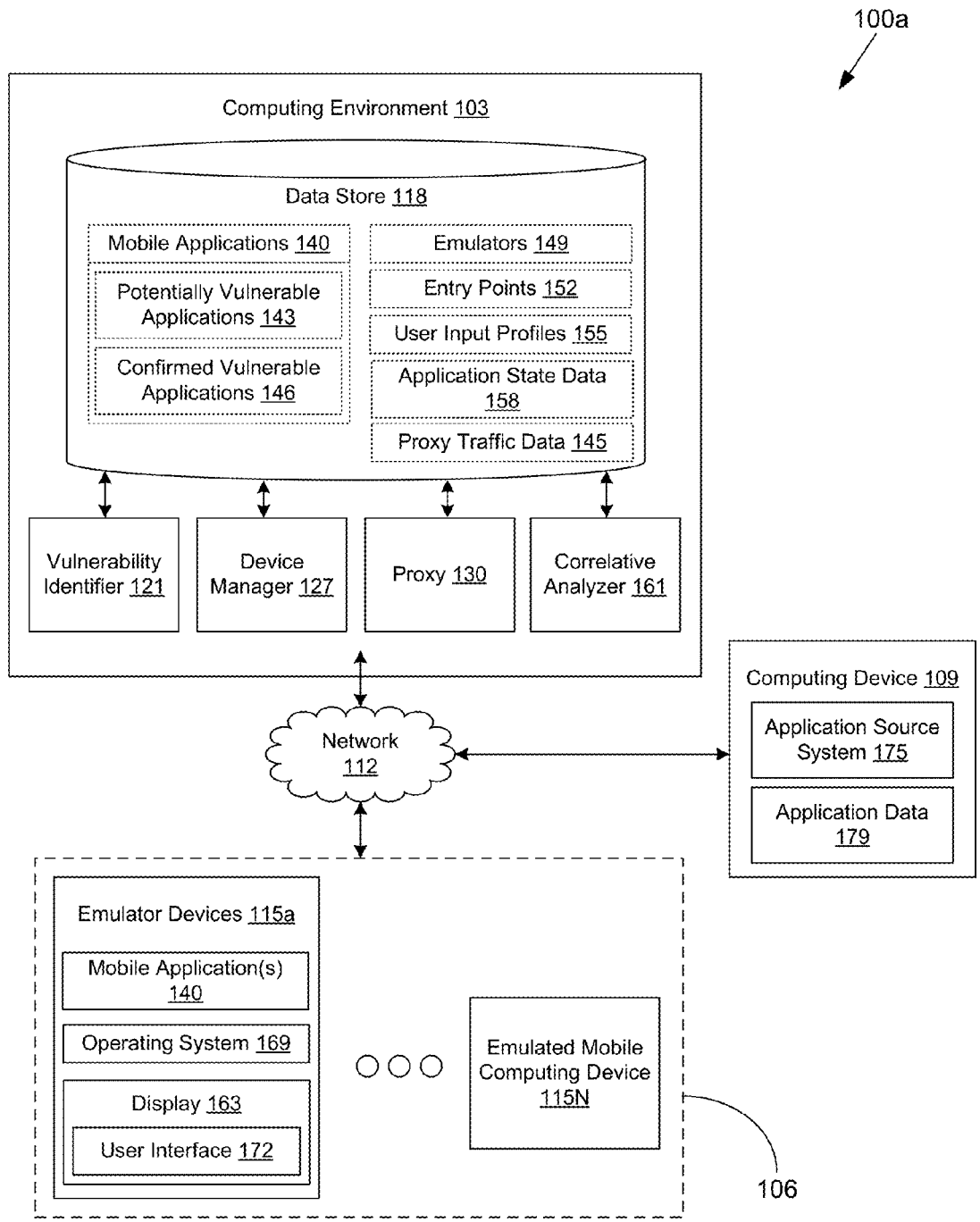
FIG. 1 is a drawing of a networked environment according to various embodiments of the present disclosure.

With reference to FIG. 1, shown is a networked environment 100a according to various embodiments. The networked environment 100a includes a computing environment 103 in data communication with a testing environment 106 and one or more computing devices 109 by way of a network 112. The testing environment 106 includes a plurality of emulator devices 115a, 115b ... 115N. The network 112 includes, for example, the Internet, intranets, extranets, wide area networks (WANs), local area networks (LANs), wired networks, wireless networks, or other suitable networks, etc., or any combination of two or more such networks.

The computing environment 103 can comprise, for example, a computing device such as a server computer or any other system providing computing capability. Alternatively, a plurality of computing devices can be employed that are arranged, for example, in one or more server banks or computer banks or other arrangements. For example, a computing environment 103 can comprise a cloud computing resource, a grid computing resource, and/or any other distributed computing arrangement. The computing environment 103 can include computing devices that can be located in a single installation or can be distributed among many different geographical locations.

Various applications and/or other functionality can be executed in the computing environment 103 according to various embodiments. Also, various data is stored in a data store 118 that is accessible to the computing environment 103. The data store 118 can be representative of a plurality of data stores 118 as can be appreciated. The data stored in the data store 118, for example, is associated with the operation of the various applications and/or functional entities described below.

The components executed on the computing environment 103, for example, include a vulnerability identifier 121, a device manager 127, a proxy 130, a correlative analyzer 133, and other applications, services, processes, systems, engines, or functionality not discussed in detail herein. The vulnerability identifier 121 can be executed to traverse through a plurality of mobile applications retrieved from an application source system 175 to identify which ones of the mobile applications are potentially vulnerable. In one embodiment, the vulnerability identifier 121 can be configured perform a static analysis to identify the applications that use their own implementation of a standard certificate validation process or a modified version of a security protocol.

Once the vulnerability identifier 121 has identified the potentially vulnerable applications that involve a modified version of a security protocol, the vulnerability identifier 121 can be configured to identify an entry point window corresponding to the vulnerability of the application. In this regard, the vulnerability identifier 121 can be configured to identify the entry point window that leads to the invocation of the vulnerable code identified during the static analysis. The vulnerability identifier 121 can identify user interface input elements on the entry point window. The vulnerability identifier 121 can generate smart simulated user input for each of the input elements based on identified limitations.

The device manager 127 can be configured to perform a dynamic analysis of the information identified and generated by the vulnerability identifier 121. In one embodiment, the device manager 127 can be configured to install and initiate execution of each of the applications in a plurality of emulator devices 115. In this regard, the device manager 127 can be configured to manage the emulator devices 115 and monitor the state of each of the applications running on each of the emulator devices 115.

The proxy 130 can be a MITM proxy configured to execute an SSL MITM attack. The proxy 130 can be configured to intercept all network traffic between the emulator devices 115 and each of the applications running on the emulator devices 115. The proxy 130 can also be configured to report the network traffic back to the computing environment 103. To this end, the proxy 130 can facilitate detecting the vulnerabilities by successfully attacking each of the applications.

The correlative analyzer 133 can be configured to confirm which of the applications identified initially as potentially vulnerable are in fact actually vulnerable. In other words, the correlative analyzer 133 determines which of the applications involve security protocols that do not protect information as intended. In particular, the correlative analyzer 133 uses logs generated by the device manager 127 and the proxy 130 to determine which of the applications were actually attacked by the proxy 130. In one embodiment, the correlative analyzer maps successful attacks identified from data retrieved from the proxy 130 to the actual application that was attacked. By matching the attacks to the time periods in which the application was executing on an emulator device 115, the correlative analyzer 133 can determine which applications are vulnerable.

The data stored in the data store 118 includes, for example, mobile applications 140. Each of the mobile applications 140 can further include an indication of potentially vulnerable applications 143 and confirmed vulnerable applications 146. According to some embodiments, the vulnerability identifier 121 can be configured to identify which ones of the mobile applications 140 are the potentially vulnerable applications 143. Similarly, the correlative analyzer 133 can be configured to identify which ones of the mobile applications 140 are the confirmed vulnerable applications 146. The mobile applications 140, including the potentially vulnerable applications 143 and the confirmed vulnerable applications 146, can correspond to applications, including executable code and data, which can be offered in an application marketplace or can be otherwise submitted by third parties for detection an identification of vulnerabilities. In some cases, the execution of a mobile application 140 can be modeled as a sequence of activities or phases that involve the user. In one embodiment, the mobile applications 140 can be specially instrumented to facilitate identification of vulnerabilities.

The mobile applications 140, including the potentially vulnerable applications 143 and the confirmed vulnerable applications 146, can be supported by one or more different mobile computing platforms. In one non-limiting example, at least some of the mobile applications 140 can be executable on the ANDROID platform and can correspond to the ANDROID package (APK) file format. In another non-limiting example, at least some of the mobile applications 140 can be executable on the IPHONE platform and can correspond to the IPHONE package archive (IPA) file format.

The data stored in the data store 118 can further include, for example, emulators 149, entry points 152, user input profiles 155, application state data 158, proxy traffic data 161, and potentially other data. The emulators 149 can correspond to a queue of emulator devices 115 that are available to the device manager 127 to emulate each of the potentially vulnerable applications 143. Emulators 149 can also indicate the internal state of each emulator device 115 such that the device manager 127 can take corrective action by restarting an emulator device 115 in the event that the emulator device 115 has encountered an error. The emulators 149 can be used by the device manager 127 to schedule and distribute testing of the potentially vulnerable applications 143 across multiple running emulator devices 115.

In some embodiments, the emulators 149 correspond to software that enables emulation or virtualization of a particular emulator device 115. The emulators 149 can emulate the various hardware resources, the performance characteristics, and/or other characteristics of an emulator device 115. In some cases, the emulators 149 can obtain device performance data related to each of the emulator devices 115 to facilitate emulation. The device performance data can indicate the performance characteristics of particular emulator devices 115, e.g., processor performance, memory performance, touchscreen performance, etc. The device performance data can be in a format suitable to configure operation of the emulators 149. The entry points 152 can correspond to the identified entry point windows that correspond to the vulnerability of the potentially vulnerable application 143.

The user input profiles 155 include data used to generate simulated user input to be provided to the executing instances of the mobile applications 140 on the emulator devices 115. The simulated user input can include textual input, touchscreen gesture input, audio input, image input, and/or other forms of user input. The user input profiles 155 can be generated based at least in part on the static analysis of a mobile application 140, a manual confirmation of user inputs obtained by way of the vulnerability identifier 121, a randomized approach, and/or other approaches. The user input profiles 155 can be the same for a particular mobile application 140 across multiple different emulator devices 115 or can differ across multiple different emulator devices 115.

In some embodiments, the user input profiles 155 can indicate the types of user input that are elicited by the mobile application 140 at various times or stages of execution. For example, the user input profiles 155 can indicate that a particular mobile application 140 has an entry point 152 window that presents a screen of two buttons, selection of one button leads to a first activity, and selection of another button leads to a second activity. Further analysis can indicate that the first activity expects the user to fill in textual input in two text regions, while the second activity expects the user to supply a swipe gesture. The user input profiles 155 can also indicate what data the mobile application 140 expects to obtain, e.g., from a configuration file or other source. The user input profiles 155 can store each of the expected types of user input in storage buckets based on the mobile application 140.

The application state data 158 can correspond to data associated with states of each of the mobile applications 140 running on the emulator devices 115. For example, if a state change occurs during the execution of one of the mobile applications 140 on one of the emulator devices 115, then the state change can be recorded in application state data 158. In one embodiment, each of the state changes for each of the mobile applications 140 can be stored in a storage bucket associated with each of the mobile applications 140.

The proxy traffic data 161 can correspond to data that is intercepted between each of the mobile applications 140 executing on the emulator devices 115 and the target server each of the mobile applications 140 is trying to access. If the proxy 130 is successful in attacking and thereby intercepting the communication, the proxy 130 can obtain data regarding the communications between the mobile applications 140 and the target server. The proxy 130 can be configured to store the intercepted communication data under proxy traffic data 161.

The testing environment 106 can include a networked array of emulator devices 115 which are maintained for the purposes of automated testing and verification of mobile applications 140, specifically the potentially vulnerable applications 143 identified by the vulnerability identifier 121. The emulator devices 115 can correspond to different device platforms (e.g., BLACKBERRY, IPHONE, ANDROID, etc.) and different models of devices from a variety of manufacturers. Although a particular emulated mobile application 140 can be tested on multiple different emulator devices 115, the testing environment 106 can include multiple units of the same emulator device 115 to support concurrent testing of multiple mobile applications 140. Each of the emulator devices 115 can correspond to an emulator 149 executed in a computing device, for example, within the computing environment 103. In some cases, multiple emulators 149 can be executed in a single computing device.

Each emulator device 115 can be associated with an actual mobile computing device that comprises, for example, a processor-based system such as a computer system. Each of the emulator devices 115 can be embodied in the form of a laptop computer, personal digital assistants, cellular telephones, smartphones, music players, web pads, tablet computer systems, game devices, electronic book readers, or other devices with like capability. Each of the emulator devices 115 can be associated with a display 163. The display 163 can comprise, for example, one or more devices such as liquid crystal display (LCD) screens, gas plasma-based flat panel displays, organic light emitting diode (OLED) displays, electronic ink displays, or other types of display devices, etc. The emulator devices 115 can be executed by the computing environment 103 or by an external computing device or environment.

Each of the emulator devices 115 can be configured to execute various systems such as one or more mobile applications 140, an operating system 169, and/or other systems. The testing management layer 166 is executed to facilitate management of the particular emulator device 115 for the device manager 127. To this end, the device manager 127 can be configured to enable initialization or reset of the emulator device 115, installation of mobile applications 140, performance monitoring, and/or other features related to management of testing. In one embodiment, the testing management layer 166 can incorporate the commercially available ANDROID Monkey and Robotium applications. The mobile applications 140 correspond to the potentially vulnerable applications 143 from the data store 118 which are loaded onto the emulator device 115 for testing. The mobile applications 140 can be configured to render a user interface 172 on the display 163.

The computing device 109 can comprise, for example, a server computer or any other system providing computing capability. Alternatively, a plurality of computing devices 109 can be employed that are arranged, for example, in one or more server banks or computer banks or other arrangements. For example, a plurality of computing devices 109 together can comprise a cloud computing resource, a grid computing resource, and/or any other distributed computing arrangement. Such computing devices 109 can be located in a single installation or can be distributed among many different geographical locations. For purposes of convenience, the computing device 109 is referred to herein in the singular. Even though the computing device 109 is referred to in the singular, it is understood that a plurality of computing devices 109 can be employed in the various arrangements as described above.

Various applications and/or other functionality can be executed in the computing device 109 according to various embodiments. The components executed on the computing device 109, for example, include an application source system 175, application data 179, other applications, services, processes, systems, engines, or functionality not discussed in detail herein. The application source system 175 is executed to transfer one or more mobile applications 140 from a source entity (e.g., a developer, publisher, and so on) to the computing environment 103 for testing.

The application source system 175 can be embodied as an application marketplace that includes various data relating to the operation of the application marketplace system. The application data 179 can describe the various mobile applications 140 which are offered for download, pricing for the mobile applications 150, information about which mobile applications 140 are compatible with which emulator devices 115, metadata for the mobile applications 140, and/or other information.

Figure 2:
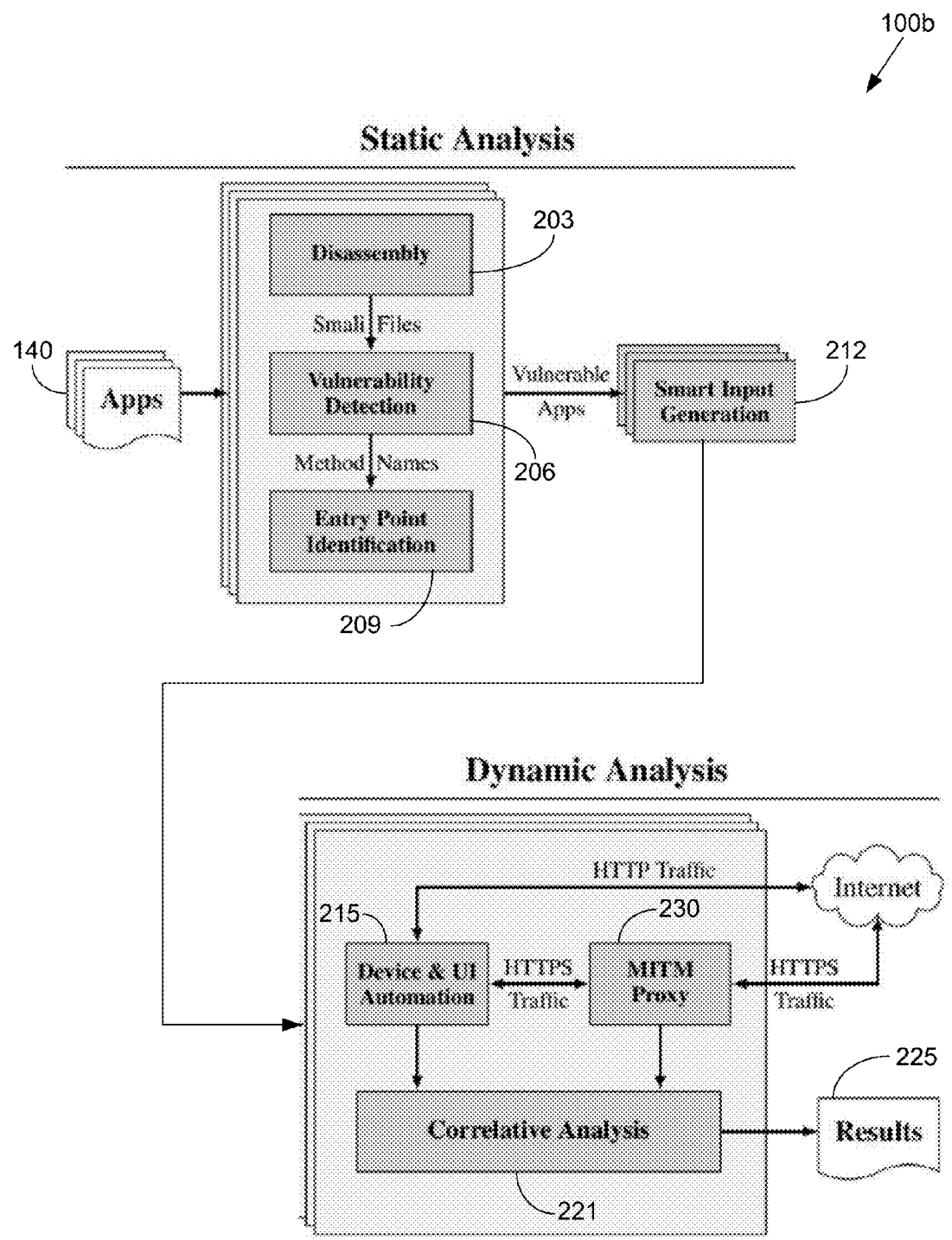
FIG. 2 is a block diagram illustrating examples of functionality implemented by the networked environment of FIG. 1.

Turning now to FIG. 2, shown is an example of a system overview for a portion of the automated detection of application vulnerabilities in a networked environment 100b according to various embodiments. It is understood that the system overview of FIG. 2 provides merely an example of the many different types of functional arrangements that can be employed to implement the operation of the portion of the systems and methods disclosed herein. As an alternative, the system overview of FIG. 2 can be viewed as depicting an example of steps of a method implemented in the computing environment 103 (FIG. 1) according to one or more embodiments.

In the networked environment 100b, the system overview includes a portion corresponding to a static analysis of the mobile applications 140 and a portion corresponding to a dynamic analysis of the mobile applications 140. To maintain feasibility of testing a large number of mobile applications 140 in a limited amount of time, the systems and methods disclosed herein use static analysis techniques to reduce the number of windows tested, following which, the systems and methods disclosed herein use a dynamic analysis technique to test multiple mobile applications 140 in parallel.

In the static analysis portion of the system for automated detection of application vulnerabilities, the mobile applications 140 are provided to the vulnerability identifier 121 to perform disassembly 203, vulnerability detection 206, entry point identification 209, and smart input generation 212. In some embodiments, the vulnerability identifier 121 performs disassembly 203 on each of the mobile applications 140 to disassemble the mobile applications 140 to a human-readable format. In one embodiment, the human-readable format is Smali. Once the mobile application 140 has been disassembled, the vulnerability identifier 121 performs the vulnerability detection 206 that can involve determining whether the mobile application 140 over-rides the X509TrustManager or HostNameVerifier interfaces. The mobile applications 140 that do not override these interfaces either do not use SSL or use the built-in SSL support without modification, and can there be considered secure. The mobile applications 140 that do override these interfaces introduce vulnerabilities at the entry point 152 window corresponding to vulnerable code associated with the over-ridden interface implementation.

The mobile applications 140 that have been identified as overriding security interfaces can be determined as a potentially vulnerable application 143. The vulnerability identifier 121 performs entry point identification 209 by identifying the entry points 152 that lead to the invocation of the vulnerable code identified.

Once the mobile application 140 has been identified as a potentially vulnerable application 143, the vulnerability identifier 121 can generate user input profiles 155 corresponding to user input elements on the entry point 152 window. The user input profiles 155 can correspond to simulated user input generated based on limitations identified for each of the user input elements. For example, suppose one user input element requires a password consisting of at least one alphabetic character and at least one numeric character. The smart input generator 212 can generate the proper user input profile 155 for the user input element whereby the user input profile 155 contains one alphabetic character and one numeric character. The user input profile can, for example, be stored in a storage bucket associated with the potentially vulnerable application 143 being tested.

In the dynamic analysis portion of the system for automated detection of application vulnerabilities, the device manager 127 installs and instantiates execution of the potentially vulnerable applications 143 on the emulator devices 115. The device manager 127 then begins the user interface automation 215 to each of the potentially vulnerable applications 143 to provide the user input profiles 155 at the entry point 152.

The proxy 130 can attempt an attack on the HTTPS traffic between the potentially vulnerable applications 143 executing and the Internet. The proxy 130 can store data regarding successful attacks and associated communications intercepted in response to the successful attack in proxy traffic data 161. The correlative analyzer 133 can perform a correlative analysis 221 by mapping successful attacks recorded by the proxy traffic data 161 to the corresponding potentially vulnerable application 143. The correlative analyzer 133 can determine which of the potentially vulnerable applications 143 are in fact the confirmed vulnerable applications 146 and send the results 225 to the application source system 175.

Figure 3:
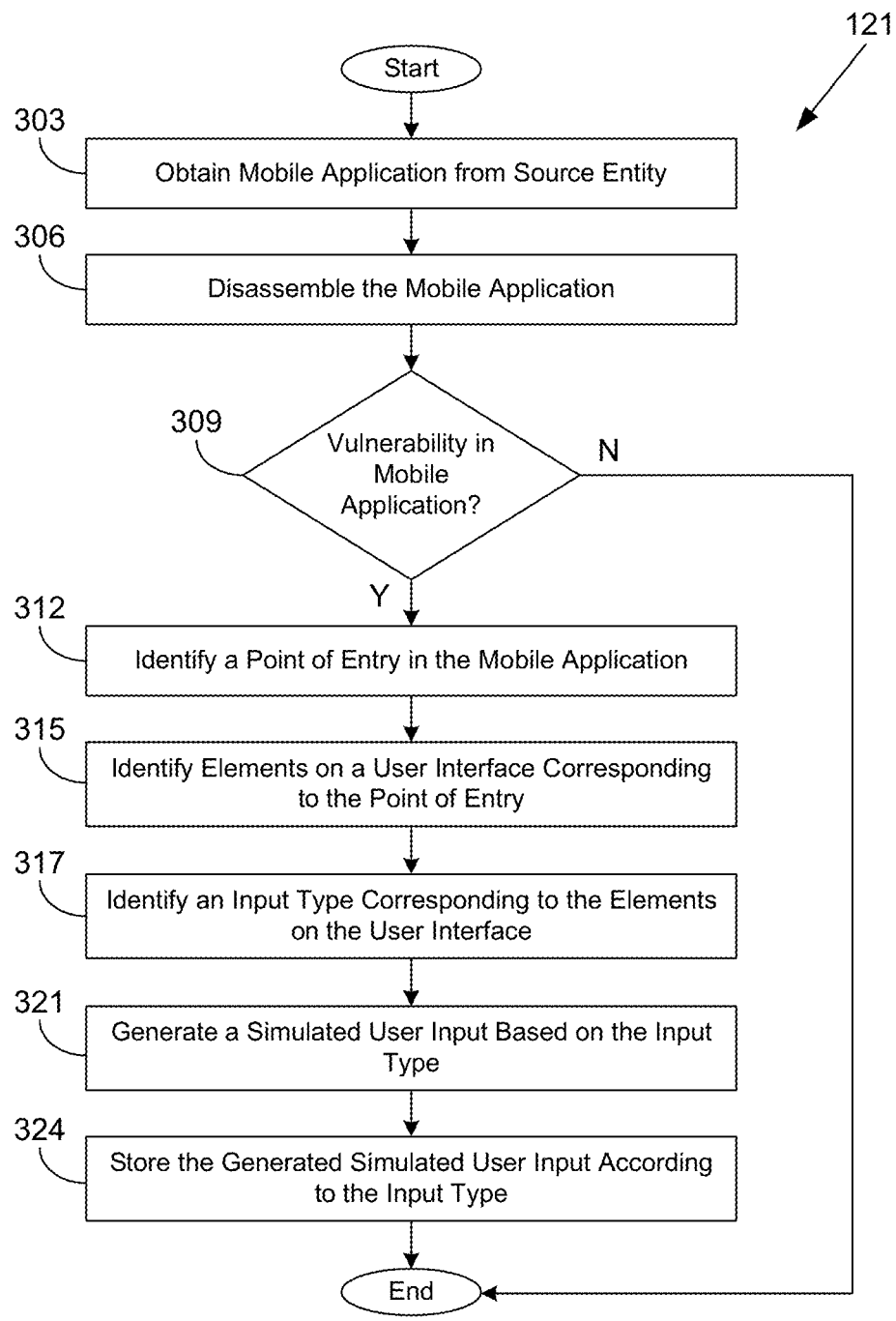
FIG. 3 is a flowchart illustrating examples of functionality implemented as portions of an application vulnerability service executed in a computing environment in the networked environment of FIG. 1.

Referring next to FIG. 3, shown is a flowchart that provides one example of the operation of a portion of the vulnerability identifier 121 according to various embodiments. It is understood that the flowchart of FIG. 3 provides merely an example of the many different types of functional arrangements that can be employed to implement the operation of the portion of the vulnerability identifier 121 as described herein. As an alternative, the flowchart of FIG. 3 can be viewed as depicting an example of steps of a method implemented in the computing environment 103 according to one or more embodiments.

Beginning with box 303, the vulnerability identifier 121 obtains a mobile application 140 from a source entity. For example, a developer can upload the mobile application 140 to the application source system 175, which can be embodied as an application marketplace. Alternatively, the vulnerability identifier 121 can configure the emulator devices 115 to obtain the mobile application 140 from the application source system 175.

In box 306, the vulnerability identifier 121 disassembles the mobile application 140 into a human-readable format, for example, Smali. Alternatively, the vulnerability identifier 121 can decompile the mobile application 140 to Java. The bytecode for the mobile application 140 can be disassembled to Smali used the apktool. Smali disassembly is relatively faster than decompiling to Java.

In box 309, the vulnerability identifier 121 determines whether the mobile application 140 is potentially vulnerable. In one embodiment, the vulnerability identifier determines whether the mobile applications 140 overrides the X509TrustManager or HostNameVerifier interfaces. The mobile applications 140 that do not override these interfaces either do not use SSL or use the built-in SSL support without modification, and can therefore be considered secure. The mobile applications 140 that do override these interfaces can often introduce vulnerabilities.

Common vulnerable implementations of the X509TrustManager and HostNameVerifier interfaces include no-op implementations, trusting self-signed certificate implementations, and check validity only implementations. The most common implementation of the X509TrustManager interface is the "no-op" implementation which asserts all certificates are valid without looking at them. In the trusting self-signed certificate implementation, the implementation checks if the certificate chain consists of a single certificate, as is the case in self-signed certificates. In this case, it uses checkValidity to check that the certificate has not expired, but does not verify the certificate's signature or ask the user if they want to trust a self-signed certificate. The check validity only implementation iterates through the certificate chain to check that each certificate has not expired. However, this implementation does not do any other type of certificate validation.

Once the vulnerability identifier 121 has determined that there is a vulnerability in the mobile application 140, the vulnerability identifier 121 has determined that the mobile application 140 is a potentially vulnerable application 143. In box 312, the vulnerability identifier 121 identifies an entry point 152 corresponding to the vulnerable code identified in the mobile application 140.

A typical mobile application 140 will have many entry points 152, such as activities or services. Therefore, dynamic analysis of each of the entry points 152 can be prohibitively slow. However, many (sometimes most) of these entry points 152 lead to code paths that do not involve making HTTPS connections. Therefore, the vulnerability identifier 121 is configured to identify only those entry points 152 that lead to the invocation of the vulnerable code identified during static analysis. To achieve this, a method call graph (MCG) is constructed for each potentially vulnerable application 143. The MCG can trace each vulnerable method back to the entry point 152 that ultimately causes the execution of the vulnerable code. The vulnerability identifier 121 can construct a graph of methods contained in the compiled version of the potentially vulnerable application 143. In one embodied, the MCG can exclude traversal of libraries due to time delay. The modified MCG traversal procedure shown in the example algorithm shown in FIG. 4 can be used to identify vulnerable entry points 152, as will be further described below.

In box 315, the vulnerability identifier 121 identifies elements on a user interface corresponding to an entry point 152 window. In one embodiment, the vulnerability identifier 121 can identify user input elements on the user interface corresponding to an entry point 152. The vulnerability identifier 121 can generate simulated user input for each of the user input elements and store the user input into user input profiles 155 based on data associated with the simulated user input and the corresponding user input element.

Simulating user interaction with the potentially vulnerable application 143 requires understanding what is being displayed on the screen and providing intelligent input. As an example, consider the login screen of an online banking app. A typical login screen will contain username and password text boxes, possibly a "remember me" check box, and a login button which will submit the user's credentials when clicked. The user will typically provide input to these elements in this order, starting with the username, and ending with tapping the login button. A useful user interface automation component as described herein can simulate this behavior without the need for human intervention or guidance.

According to some embodiments, static analysis techniques can be used to leverage information available in the metadata and code associated with the potentially vulnerable application 143 to determine a form of valid input for the input elements. In particular, vulnerability identifier 121 can use two sources of information: developer-supplied input type annotations and type casts in the code to determine the form of valid input. The input type annotations can be used by developers to control the keyboard that appears when a user selects the input field corresponding to the input element. The input type annotations can be configured to restrict the characters that the user is able to input element. The example algorithm shown in FIG. 5 can be used to generate the simulated user input for input elements associated with the entry points 152, as will be further described below.

Using the limitations to the input elements defined by analyzing each of the input elements and for example, the input type annotations of each of the input elements, the vulnerability identifier 121 identifies the input types corresponding to the input elements in box 317. In box 321, the vulnerability identifier 121 can generate a simulated user input based on the input types identified for each of the input elements on the entry point 152 window. In box 324, the simulated user input can be stored in user input profiles 155.

With reference to FIG. 4, shown is an example algorithm used to identify vulnerable entry points 152. It is understood that the algorithm of FIG. 4 provides merely an example of the many different types of functional arrangements that can be employed to implement the operation of the portion of the vulnerability identifier 121 as described herein. As an alternative, the algorithm of FIG. 4 can be viewed as depicting an example of steps of a method implemented in the computing environment 103 according to one or more embodiments.

To find entry points 152 that execute a particular vulnerable method, start at the seed in the algorithm, and traverse into its parents (the methods that call it), and into their parents, and so on, until a method that has no parents is reached. In a typical MCG traversal procedure, this would be the end of the traversal. When a method with no parents is reached, the algorithm can be configured to jump to the constructor of that method of the class and continue traversing from there. This allows for the system to continue traversing when the developer instantiates an object and passes that object to the operating system. Only when a constructor is reached that is never called in the code does the example algorithm stop traversing. These constructors can therefore be only called by system code, and can be embodied as the entry points 152 to the potentially vulnerable applications 143.

The identified vulnerable entry points 152 can correspond either to activities or services. While services are non-user interface based components mostly associated with long-running background processes that are unlikely to trigger SSL connections, the systems and methods disclosed herein can be configured to only trigger activities declared in the manifest file of the potentially vulnerable application 143. Thereafter, the example algorithm ends.

With reference to FIG. 5, shown is an example algorithm used to generate simulated user input for input elements associated with the entry points 152. It is understood that the algorithm of FIG. 5 provides merely an example of the many different types of functional arrangements that can be employed to implement the operation of the portion of the vulnerability identifier 121 as described herein. As an alternative, the algorithm of FIG. 5 can be viewed as depicting an example of steps of a method implemented in the computing environment 103 according to one or more embodiments.

As shown in the algorithm of FIG. 5, the vulnerability identifier 121 can generate smart input by attempting to assign a data type for each input element. Once a type has been assigned, the vulnerability identifier 121 can use a simple table to provide typical input of that type. The type assignment process begins by looping over every activity in the targeted potentially vulnerable application 143 (line 3). Each activity can declare a layout with a call to setContentView. The vulnerability identifier 121 can extract this call from code and load the associated layout XML file (line 4). From the layout file, the vulnerability identifier 121 can extract user interface elements, specifically elements of the EditText type, and loop over these elements to extract the element identification and input type annotation (lines 5-7). If there is a type annotation, the vulnerability identifier 121 uses that and moves on to the next user interface element (lines 8-10).

If there is no annotation, the vulnerability identifier 121 attempts to extract type information from the disassembled code of the potentially vulnerable application 143. The vulnerability identifier first finds variables that reference the elements by ID (line 11). Next, the vulnerability identifier 121 collects all parts of the code that access these variables (line 12), and for each call to the element's getText function (line 13), the vulnerability identifier 121 tracks usage of that value through any type cast operation (lines 14-15). The vulnerability identifier 121 can use any such type casts as type labels (line 17). Finally, the vulnerability identifier converts these type annotations to input strings (line 21). Thereafter, the example algorithm ends.

Turning now to FIG. 6, shown is sample code from which the vulnerability identifier 121 can extract type information. It is understood that the sample code of FIG. 6 provides merely an example of the many different types of functional arrangements that can be employed to implement the operation of the portion of the vulnerability identifier 121 as described herein. As an alternative, the sample code of FIG. 6 can be viewed as depicting an example of steps of a method implemented in the computing environment 103 according to one or more embodiments.

As shown in the sample code of FIG. 6, there are two EditText fields: one which expects an integer, but provides no input type annotation, and one which expects a phone number and uses the appropriate input type annotation. To extract these types, the vulnerability identifier 121 first looks at AndroidManifest.xml to find the activity name (MainActivity). Using this name, it next looks in MainActivity.smali to look for calls to SetContentView. The vulnerability identifier 121 then extracts the ID being passed as an argument (0x7f03 in this case).

The vulnerability identifier 121 then looks in R$layout.xml to find the name associated with that ID (activity_main). Finally, the vulnerability identifier 121 opens the associated file (activity_ main.xml), and searches for EditText fields, and extracts their names, and any input type annotations. In the case of the field named phone_field, there is now enough information to associate a type with the field: it is of type phone.

The other field, named integer_field, does not supply any type of annotation, so the vulnerability identifier 121 must rely on code analysis to determine its type. The vulnerability identifier 121 first looks the name up in the file R$id.smali to find its associated numeric ID (0x7f080000). Next, it looks in the disassembled code, specifically MainActivity.smali, in order to associate the ID with a variable name. In line 1-3 of MainActivity.smali, the vulnerability identifier 121 traces the use of the ID through a call to findViewById, which returns an object, which is then associated with the name integer. Later in the code, the vulnerability identifier 121 then uses data flow analysis provided by Androguard to find places where this name is accessed (line 5), then searches for the getText method call (line 6), and traces the result (in register v3) to a call to parseInt (line 10). Then, the vulnerability identifier 121 can associate the Integer type with the name integer_field. Thereafter, the sample code ends.

Figure 7:
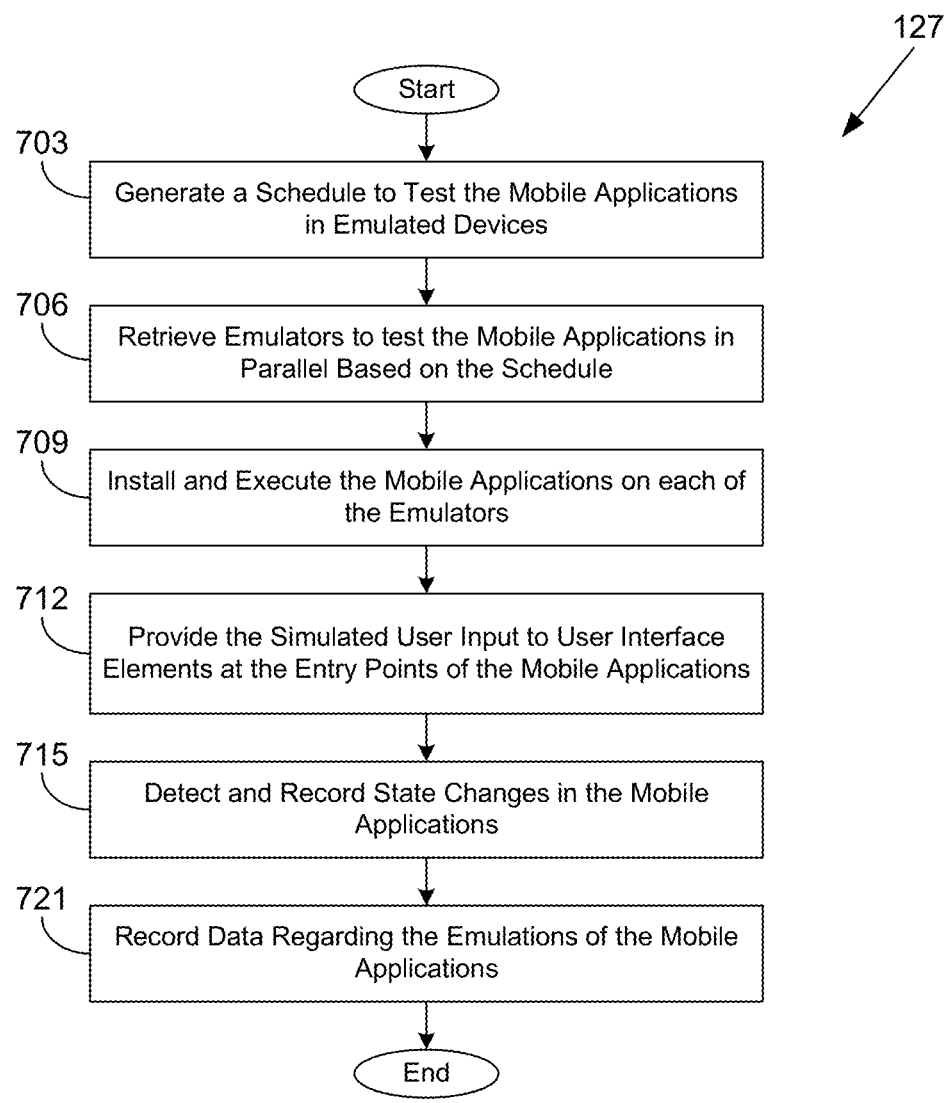
FIG. 7 is a flowchart illustrating examples of functionality implemented as portions of an application vulnerability service executed in the networked environment of FIG.

Moving on to FIG. 7, shown is a flowchart that provides one example of the operation of a portion of the device manager 127 according to various embodiments. It is understood that the flowchart of FIG. 7 provides merely an example of the many different types of functional arrangements that can be employed to implement the operation of the portion of the device manager 127 as described herein. As an alternative, the flowchart of FIG. 7 can be viewed as depicting an example of steps of a method implemented in the computing environment 103 according to one or more embodiments.

Beginning in box 703, the device manager 127 can generate a schedule to test the potentially vulnerable applications on the emulator devices 115. In embodiments implemented on the ANDROID systems, the device manager 127 can be based on the ANDROID ADB tooling framework. The device manager 127 can manage and orchestrate the process of installing mobile applications 140 on the emulated computed devices, executing user interface automation, and collecting statistics such as application logs and network traffic logs, while being tolerant towards the erratic behavior of the emulator devices 115.

The device manager 127 can comprise an emulator management thread and an application scheduling thread. The emulator management thread can be configured to manage two pools of emulator devices 115 (each of the emulator devices 115 can be associated with a respective thread): the running pool and the free pool. The free pool contains the emulator devices 115 that are ready to be used, in an "online" state, but not currently testing a potentially vulnerable application 143. When the scheduling thread of the device manager 127 requests an emulator device 115, it is removed from the free pool and returned to the scheduler. When the scheduler finishes a job, it returns the emulated mobile computing device to the emulator management thread, which adds it back to the free pool.

When the device manager 127 begins to execute installation and instantiation of the potentially vulnerable applications 143 according to the schedule, it can register a DeviceChangeListener callback with the ADB. When an emulator device 115 is initiated or dynamically added to the system, the emulator device 115 enters an "online" state. The management thread can add the emulator device 115 to both the running pool and the free pool. If the emulator device 115 ever enters an "offline" state and/or crashes, the management threat removes the emulator device 115 from both pools, stops execution on the emulator device 115, and starts a new emulator device 115 in place.

The application scheduling thread manages a list of potentially vulnerable applications 143 to be tested and processes them. An example algorithm detailing how the potentially vulnerable applications 143 are process is shown in FIG. 8 as will be further described below. The device manager 127 retrieves the emulator devices 115 to test the potentially vulnerable applications 143 according to the schedule in box 706.

In box 709, the device manager 127 installs and executes the potentially vulnerable applications 143 on the emulator devices 115 in the testing environment 106 according to the schedule. The emulator devices 115 can execute the potentially vulnerable application 143 at various states, activities, or windows. The device manager 127 can provide simulated smart user input at various points to emulate user interaction with the potentially vulnerable application 143. The simulated user input can be configured to drive execution of the potentially vulnerable application 143 in ways that are likely to lead to the vulnerable code being executed. The device manager 127 can explore code paths that originate in each vulnerable entry point 152 identified during the static analysis. An example block diagram of the user interface automation component is shown in FIG. 9, which will be further described below.

The device manager 127 can decompose the user interface into component elements. For each of these elements, the device manager 127 can extract properties such as the coordinates that define boundaries, what form of input (e.g. text or tap) it expects, etc. With this information, the device manager 127 can craft appropriate input events to send to the potentially vulnerable application 143. For example, if the user interface component is a button or a checkbox, a click event with appropriate coordinates is generated or retrieved from the user input profiles 155. If the user interface component is a textbox, then text input events can be generated or retrieved from the user input profiles 155.

In box 712, the device manager 127 can provide the simulated user input to the user interface elements of the potentially vulnerable applications 143. According to some embodiments, once the device manager 127 has identified the elements of the user interface and the type of input they require, the device manager can retrieve the input stored in user input profiles 155 to send to the potentially vulnerable application 143. In box 715, the device manager 127 detects and records state changes occurring in the potentially vulnerable applications 143. In one embodiment, the device manager 127 registers handlers for interfaces that are triggered when the state changes. In such an embodiment, the device manager 127 can be notified of state transitions.

The potentially vulnerable applications 143 can continue to run on the emulator devices 115. While running, the device manager 127 can be configured to record all data regarding the emulations of each of the potentially vulnerable applications in box 721. For example, the device manager 127 can be configured to generate and store application logs and network traffic logs for each of the potentially vulnerable applications 143.

Once the simulated user input has been provided to the entry point 152 of the potentially vulnerable application, the device manager 127 can wait until the proxy 130 attempts the MITM attack of the potentially vulnerable application. Thereafter, the execution of this portion of the device manager 127 ends.

Referring next to FIG. 8, shown is an example algorithm used to manage and process the potentially vulnerable applications 143. It is understood that the algorithm of FIG. 8 provides merely an example of the many different types of functional arrangements that can be employed to implement the operation of the portion of the device manager 127 as described herein. As an alternative, the algorithm of FIG. 8 can be viewed as depicting an example of steps of a method implemented in the computing environment 103 according to one or more embodiments.

As shown in the algorithm, the scheduler iterates over each potentially vulnerable 143 to be tested (line 2), first getting an emulator device 115 from the management thread (line 3). The device manager 127 can then install the potentially vulnerable application 143 on that emulated mobile computing device and running user interface automation on each vulnerable activity identified by static analysis (lines 4-7). Then, the scheduler uninstalls the potentially vulnerable application 143 and returns the emulator device 115 to the management thread (lines 8, 9). This algorithm can be simplified by using the scheduler to monitor the size of the running pool, and creates a thread for each emulator device 115. The device manager 127 can distribute potentially vulnerable applications 143 among them, so that the emulator devices 115 execute in parallel (i.e. the loop of line 2 is parallelized). Additionally, the scheduler handles any errors reported by the emulator devices 115. If installation fails, it retries one time, and then abandons that potentially vulnerable application 143. If failure occurs during user interface automation, it moves to the next entry point 152. Thereafter, the portion of the algorithm for the device manager 127 ends.

Referring next to FIG. 9, shown is an example block diagram showing an example of how the user interface automation is implemented. It is understood that the block diagram of FIG. 9 provides merely an example of the many different types of functional arrangements that can be employed to implement the operation of the portion of the device manager 127 as described herein. As an alternative, the block diagram of FIG. 8 can be viewed as depicting an example of steps of a method implemented in the computing environment 103 according to one or more embodiments.

In box 903, the window corresponding to the entry point 152 can be identified so that the device manager 127 can enumerate the user interface components in box 906. To identify the window's elements and extract their properties, the device manager 127 can utilize the ANDROID ViewServer, an internal component of the ANDROID application tooling framework. The ViewServer provides a set of commands that can be used to query the ANDROID WindowManager, which handles the display of user interface elements and the dispatch of input events to the appropriate element. Specifically, the device manager 127 queries the ViewServer to retrieve the entire view hierarchy, which contains all of the UI elements and their properties, such as coordinates and editability properties.

Once the device manager 127 has identified the elements of the user interface window corresponding to the entry point 152 and the types of input they require, the device manager 127 can apply the smart input, in box 909, to the elements. After which, the device manager 127 proceeds to the tap event processing in box 913. For text fields, the device manager 127 can use the text stored in user input profiles 155. Once the input event has been crafted, the device manager 127 can use the input command available through ADB. This command supports both text input events and tap events at specific coordinates.

Overall, the process of automating a window has two phases. First, the device manager 127 fills all editable text fields by iterating through them, generating tap events that focus them, then inputting the smart input generated by static analysis. Then, the device manager 127 iterates through all clickable elements and generates tap events at the appropriate coordinates. Between each tap, the user interface automation component waits for a response from the state management component to respond. When the device manager 127 receives a response, the device manager 127 proceeds to the next input element.

The device manager 127 can utilize the API provided by the ANDROID ViewServer component to obtain information about the potentially vulnerable application's 143 current state and to detect state changes. The ViewServer provides WindowChange and FocusChange events, which are triggered when the state changes. By registering handlers for these events, the device manager 127 is notified of any state transition and can record the state transition in application state data 158. The user interface automation component waits after each tap event is processed so that the handlers have time to react to a state change.

When the potentially vulnerable applications 143 transition to a new state, the user interface automation component can generate a "back button" event, which causes ANDROID to pop the current window from its stack, returning to the target window. ANDROID allows for "non-cancellable" dialogs and similar user interface components that temporarily disable the effect of the back button. In these cases, the back button event generated by the user interface automation component can have no effect. Therefore, the device manager 127 system can check for a state change before resuming normal operation. If the state remains unchanged, additional tap events can be generated. The additional tap events can be configured to click on any "OK" or "Cancel" buttons, dismissing the dialog and returning to the target window. If the state remains unchanged after three such tap events, the device manager 127 can terminate the potentially vulnerable application 143, abandoning the current activity and moving on to the next entry point 152.

Figure 10:
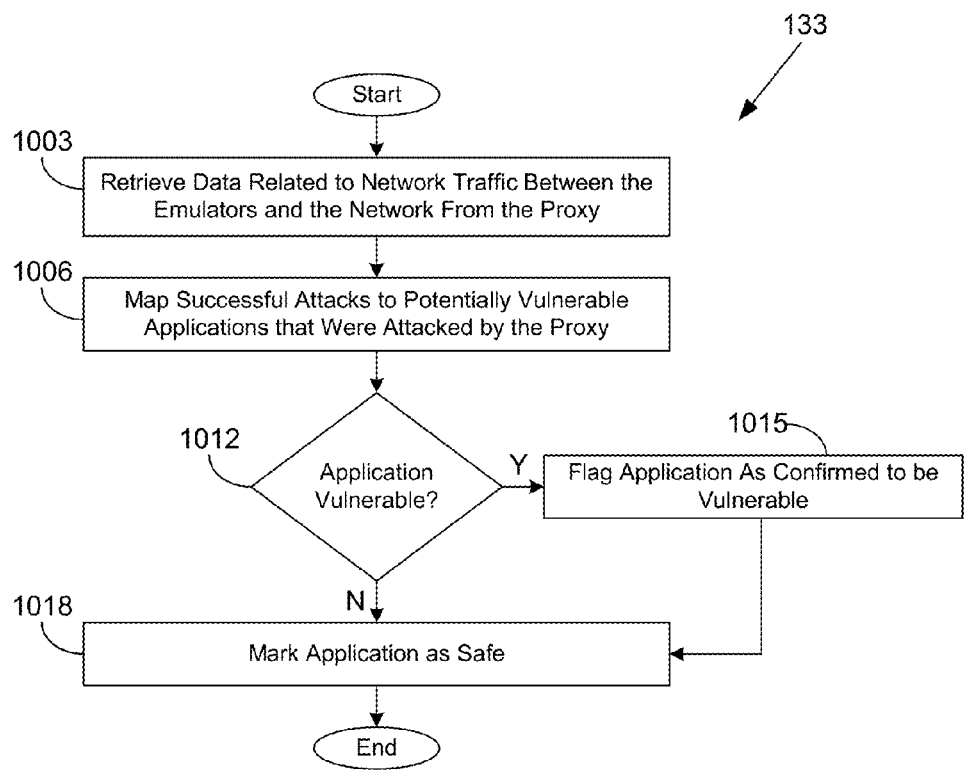
FIG. 10 is a flowchart illustrating examples of functionality implemented as portions of an application vulnerability service executed in the networked environment of FIG. 1.

Turning now to FIG. 10, shown is a flowchart that provides one example of the operation of a portion of the correlative analyzer 133 according to various embodiments. It is understood that the flowchart of FIG. 10 provides merely an example of the many different types of functional arrangements that can be employed to implement the operation of the portion of the correlative analyzer 133 as described herein. As an alternative, the flowchart of FIG. 10 can be viewed as depicting an example of steps of a method implemented in the computing environment 103 according to one or more embodiments.

Beginning with box 1003, the correlative analyzer retrieves data related to network traffic between the potentially vulnerable applications 143 executed by the emulator devices 115 and the target server. In one embodiment, the network traffic can be obtained from the proxy 130. The proxy 130 can execute, for example, an SSL MITM attack to intercept all HTTPS traffic between the emulator devices 115 and the Internet. When running the multiple emulator devices 115 in parallel, the proxy 130 can require the ability to manage the sheer number of simultaneous connections. The proxy 130 can use, for example, Mallory or the Burp Suite proxy. The proxy 130 can be configured to allow other computing devices of users to write scripts that modify or log the network traffic data to log successful HTTPS connections, or successful attacks, to the data store 118. The proxy 130 can use iptables to bypass the proxy for all non-HTTPS traffic, reducing the load on the proxy 130 and allowing the computing environment 103 to scale to the required level.

The proxy 130 can intercept communications between the potentially vulnerable applications 143 and the Internet. The proxy 130 can then store data regarding the intercepted communications in proxy traffic data 161. In some embodiments, the proxy 130 can detect vulnerabilities by successfully attacking the potentially vulnerable applications 143. In one embodiment, the proxy 130 can not be able to map the vulnerability back to the potentially vulnerable application 143 that was attacked.

Because several potentially vulnerable applications 143 are tested in parallel, there can be multiple successful attacks at approximately the same time. Further, network delays can cause timestamps to differ slightly between the device manager 127 and the proxy 130. In embodiments in which the emulator devices 115 are running on the same machine and sharing the same network interface, the correlative analyzer 133 can use domain name service (DNS) lookups to facilitate matching the times that a potentially vulnerable mobile application 143 was executed with the time period that the proxy traffic data 161 indicates a successful attack.

In box 1006, the correlative analyzer maps the successful attacks to the potentially vulnerable applications 143 that were attacked by the proxy 130. In one embodiment, installation timestamps from the device manager 127 can be used to map each of the potentially vulnerable applications 143 to the block of time it was running on the emulator device 115. Network logs from the device manager 127 can be traversed for DNS queries, which can further be used to map time blocks of application execution to Internet domains. Finally, the proxy traffic data 161 can be used to generate a second mapping from the time blocks of application execution to the Internet domains. When a time block from the proxy 130 overlaps a time block from the device manager 127 indicating that a potentially vulnerable application 143 was accessing the same domain, the associated potentially vulnerable application can be marked as a confirmed vulnerable application 146. In this way, the correlative analyzer can determine whether the potentially vulnerable application is in fact vulnerable, in box 1012.

If it is determined that the potentially vulnerable application 143 is vulnerable, then in box 1015, the corresponding mobile application can be marked as a confirmed vulnerable application 143 and the confirmed vulnerability can be reported to the application source system 175. Otherwise, the correlative analyzer 133 can determine that the potentially vulnerable application 143 is not vulnerable in response to receiving an indication that the proxy 130 could not attempt a MITM attack on the corresponding mobile application 140, or otherwise. Then, in box 1018, the potentially vulnerable application 143 can be marked as safe and the satisfactory performance of the mobile application 140 can be reported to the application source system 175. Thereafter, this portion of the correlative analyzer 133 ends.

Figure 11:
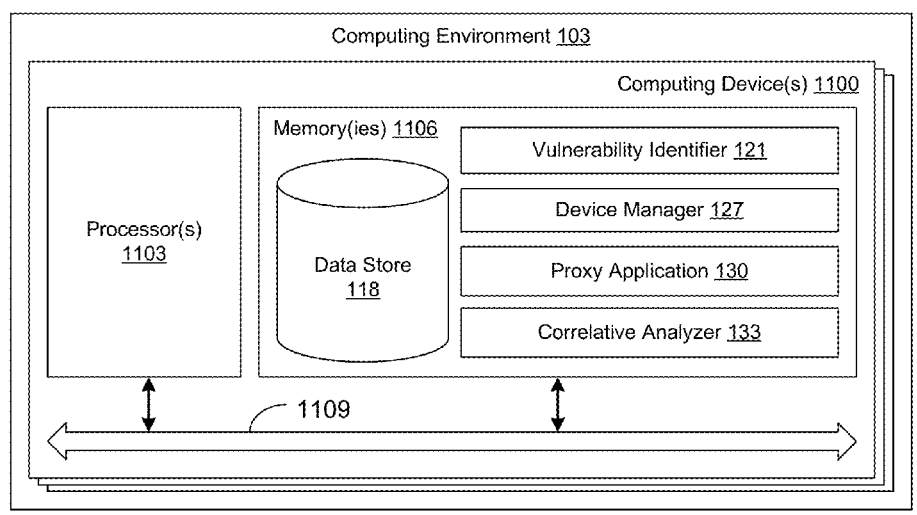
FIG. 11 is a schematic block diagram that provides one example illustration of a computing environment employed in the networked environment of FIG. 1.

With reference to FIG. 11, shown is a schematic block diagram of the computing environment 103 according to an embodiment of the present disclosure. The computing environment 103 includes one or more computing devices 1100. Each computing device 1100 includes at least one processor circuit, for example, having a processor 1103 and a memory 1106, both of which are coupled to a local interface 1109. To this end, the computing device 1100 can comprise, for example, at least one server computer or like device. The local interface 1109 can comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the vulnerability identifier 121, the device manager 127, the proxy 130, the correlative analyzer 133, and potentially other applications. Also stored in the memory 1106 can be a data store 118 and other data. In addition, an operating system can be stored in the memory 1106 and executable by the processor 1103.

It is understood that there can be other applications that are stored in the memory 1106 and are executable by the processor 1103 as can be appreciated. Where any component discussed herein is implemented in the form of software, any one of a number of programming languages can be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1106 and are executable by the processor 1103. In this respect, the term "executable" means a program file that is in a form that can ultimately be run by the processor 1103. Examples of executable programs can be, for example, a compiled program that can be translated into machine code in a format that can be loaded into a random access portion of the memory 1106 and run by the processor 1103, source code that can be expressed in proper format such as object code that is capable of being loaded into a random access portion of the memory 1106 and executed by the processor 1103, or source code that can be interpreted by another executable program to generate instructions in a random access portion of the memory 1106 to be executed by the processor 1103, etc. An executable program can be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 1103 can represent multiple processors 503 and the memory 1106 can represent multiple memories 506 that operate in parallel processing circuits, respectively. In such a case, the local interface 1109 can be an appropriate network that facilitates communication between any two of the multiple processors 503, between any processor 1103 and any of the memories 506, or between any two of the memories 506, etc. The local interface 1109 can comprise additional systems designed to coordinate this communication, including, for example, performing load balancing. The processor 1103 can be of electrical or of some other available construction.

Although the vulnerability identifier 121, the device manager 127, the proxy 130, the correlative analyzer 133, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the mobile application verification service 124. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor 1103 in a computer system or other system. The machine code can be converted from the source code, etc. If embodied in hardware, each block can represent a circuit or a number of interconnected circuits to implement the specified logical function(s).

Although the flowcharts of FIGS. 3 and 4 show a specific order of execution, it is understood that the order of execution can differ from that which is depicted. For example, the order of execution of two or more blocks can be scrambled relative to the order shown. Also, two or more blocks shown in succession in FIGS. 3 and 4 can be executed concurrently or with partial concurrence. Further, in some embodiments, one or more of the blocks shown in FIGS. 3 and 4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the vulnerability identifier 121, device manager 127, proxy 130, or correlative analyzer 133, that comprises software or code can be embodied in any non-transitory computer-readable medium for use by or in connection with an instruction execution system such as, for example, a processor 1103 in a computer system or other system. In this sense, the logic can comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications Therefore, the following is claimed:

1. A non-transitory computer-readable medium embodying at least one program that, when executed by at least one computing device, causes the at least one computing device to at least:
obtain a plurality of mobile applications from a source entity;
generate a plurality of method call graphs individually corresponding to a respective one of the plurality of mobile applications;
identify an entry point corresponding to a potential vulnerability in the mobile applications based at least in part on the plurality of method call graphs and at least one overridden interface from an SSL library;
generate a simulated user input for an element of a user interface associated with the entry point based at least in part on an input type associated with the element of the user interface;
install and initiate execution of each of the mobile applications in a plurality of emulated mobile computing devices;
provide the simulated user input to each of the mobile applications in response to determining that a state of each of the mobile applications corresponds to the entry point; and
determine that a communication interception obtained from a proxy corresponds to one of the mobile applications in response to obtaining the communication interception from the proxy, wherein the communication interception indicates the proxy successfully intercepted traffic from the corresponding one of the mobile applications.

2. The non-transitory computer-readable medium of claim 1, wherein the at least one program further causes the at least one computing device to at least determine whether the entry point of the one of the mobile applications is vulnerable in response to analyzing the communication interception obtained from the proxy.

3. The non-transitory computer-readable medium of claim 2, wherein the at least one program further causes the at least one computing device to at least report performance of the one of the mobile applications to the source entity in response to determining that the one of the mobile applications is vulnerable.

4. The non-transitory computer-readable medium of claim 1, wherein the at least one program further causes the at least one computing device to at least disassemble each of the mobile applications to a human readable format to identify the entry point corresponding to the potential vulnerability in the mobile applications.

5. The non-transitory computer-readable medium of claim 1, wherein the at least one program further causes the at least one computing device to at least generate a schedule for emulating the mobile computing devices, the schedule defining a timing for obtaining the emulated mobile computing devices to install and execute each of the mobile applications on a respective emulated mobile computing device, and wherein installing and executing each of the mobile applications in the emulated mobile computing devices is executed according to the schedule.

6. The non-transitory computer-readable medium of claim 1, wherein the proxy is configured to intercept and record network traffic data between the mobile applications executed by the emulated mobile computing devices and a target domain, and wherein the communication interception corresponds to a portion of the network traffic data associated with the potential vulnerability of the one of the mobile applications.

7. The non-transitory computer-readable medium of claim 6, wherein the network traffic data comprises logging success data and logging failure data.

8. A system, comprising:
a data store; and
at least one computing device in communication with the data store, the at least one computing device being configured to at least:
identify a plurality of mobile applications that are associated with a potential vulnerability;
generate a plurality of method call graphs individually corresponding to a respective one of the plurality of mobile applications;
identify an entry point corresponding to the potential vulnerability in the mobile applications based at least in part on the plurality of method call graphs and at least one overridden interface from an SSL library;
install and initiate execution of the mobile applications in a plurality of emulated mobile computing devices;
provide a simulated user input for an element of a user interface associated with the entry point for each of the mobile applications, the simulated user input configured to test the potential vulnerability of each of the mobile applications; and
determine that a proxy intercepted communications from at least one of the mobile applications in response to analyzing network traffic data associated with the entry point and the mobile applications.

9. The system of claim 8, wherein the at least one computing device is further configured to at least:
disassemble each of the mobiles applications to a human readable format; and
determine whether each of the mobile applications use a modified implementation of a pre-defined security protocol.

10. The system of claim 8, wherein the at least one computing device is further configured to at least manage the installation and execution of each of the mobile applications on the emulated mobile computing devices according to a schedule.

11. The system of claim 8, wherein the at least one computing device is further configured to at least record a state change that occurred during execution of at least one of the mobile applications in response to determining that the state change occurred during execution of the at least one of the mobile applications.

12. The system of claim 8, wherein the network traffic data comprises logging success data associated with each of the mobile applications, wherein the logging success data corresponds to at least one successful access to a target domain using the simulated user input provided via the element of the user interface.

13. The system of claim 12, wherein the at least one computing device is further configured to at least determine that the at least one of the mobile applications improperly granted the at least one successful access to the target domain to determine whether the at least one of the mobile applications is vulnerable.

14. A method comprising:
identifying, by at least one computing device, a plurality of applications that are associated with a potential vulnerability;

generating, by the at least one computing device, a plurality of method call graphs individually corresponding to a respective one of the plurality of applications;

identifying, by the at least one computing device, an entry point corresponding to the potential vulnerability in the plurality of applications based at least in part on the plurality of method call graphs and at least one overridden interface from an SSL library;

installing and initiating execution of the applications, by the at least one computing device, in a plurality of emulated mobile computing devices;

providing, by the at least one computing device, a simulated user input for an element of a user interface associated with the entry point for each of the applications; and determining, by the at least one computing device, at least one of the applications is vulnerable in response to determining that a proxy successfully intercepted traffic from the at least one of the applications by processing network traffic data associated with the entry point of each of the applications.

15. The method of claim 14, wherein the network traffic data is obtained from the proxy that successfully intercepted traffic from the at least one of the applications, and the network traffic data comprises logging success data, logging failure data, a plurality of time periods associated with each of the applications executed by the emulated computing devices, and a server each of the applications are communicating with.

16. The method of claim 14, wherein the potential vulnerability is a man-in-the-middle attack.

17. The method of claim 14, further comprising determining, by the at least one computing device, whether each of the applications uses a modified implementation of a pre-defined security protocol, wherein the pre-defined security protocol comprises at least one of a secure sockets layer or a transport layer security.

18. The method of claim 14, further comprising:
determining, by the at least one computing device, whether a time block in the network traffic data corresponds to a time period that one of the applications was executing;

determining, by the at least one computing device, whether a domain associated with the time block in the network traffic data corresponds to the domain associated with the time period during which the one of the applications was running; and recording, by the at least one computing device, the potential vulnerability of the one of the applications as a confirmed vulnerability in a data store.

19. The method of claim 18, further comprising reporting, by the at least one computing device, the confirmed vulnerability of the one of the applications to a source entity.

20. The method of claim 14, further comprising storing, by the at least one computing device, the applications in respective storage buckets in response to identifying whether each of the applications are potentially vulnerable and confirmed as being vulnerable.

* * * * *